US012694620B2

(12) United States Patent
Wen et al.

(10) Patent No.: US 12,694,620 B2
(45) Date of Patent: Jul. 28, 2026

(54) DEPTH RENDERING FROM NEURAL RADIANCE FIELDS FOR 3D MODELING

(71) Applicant: Electronic Arts Inc., Redwood City, CA (US)

(72) Inventors: Yangming Wen, Fremont, CA (US); Gianvito Serra, Austin, TX (US)

(73) Assignee: Electronic Arts Inc., Redwood City, CA (US)

( * ) Notice: Subject to any disclaimer, the term of this patent is extended or adjusted under 35 U.S.C. 154(b) by 161 days.

(21) Appl. No.: 18/670,172

(22) Filed: May 21, 2024

(65) Prior Publication Data

US 2025/0363741 A1 Nov. 27, 2025

(51) Int. Cl.
*G06T 17/20* (2006.01)
*G06T 7/70* (2017.01)

(52) U.S. Cl.
CPC ............... *G06T 17/20* (2013.01); *G06T 7/70* (2017.01); *G06T 2207/20081* (2013.01)

(58) Field of Classification Search
CPC .................................. G06T 17/20; G06T 7/70
USPC .......................................................... 345/420
See application file for complete search history.

(56) References Cited

U.S. PATENT DOCUMENTS 10,593,101 B1 * 3/2020 Han ........................ G06N 3/045
12,148,089 B2 * 11/2024 Phogat .................... G06T 11/20

2021/0295599 A1 * 9/2021 Adkinson ............... G06T 17/20
2024/0119658 A1 * 4/2024 Chu ......................... G06T 15/20
2024/0404191 A1 * 12/2024 Liu ........................... G06T 7/70
2025/0173934 A1 * 5/2025 Kuo ......................... G06T 7/20

OTHER PUBLICATIONS

Metzer et al. "Latent-NeRF for Shape-Guided Generation of 3D Shapes and Textures," Proceedings of the IEEE/CVF Conference on Computer Vision and Pattern Recognition (CVPR), pp. 12663-12673 (available at: https://arxiv.org/abs/2211.07600) (Jun. 17-24, 2023).
Mildenhall et al. "NeRF: Representing Scenes as Neural Radiance Fields for View Synthesis," Communications of the ACM, vol. 65, Iss. 1, pp. 99-106 (available at: https://arxiv.org/abs/2003.08934) (Dec. 17, 2021).

(Continued)

*Primary Examiner* — Samantha (Yuehan) Wang
(74) *Attorney, Agent, or Firm* — Leydig, Voit & Mayer, Ltd.

(57) ABSTRACT

A method of generating a three-dimensional (3D) model includes obtaining a set of two-dimensional (2D) images of a scene acquired by one or more cameras from a set of camera angles and camera positions, obtaining the set of camera angles and camera positions based on obtaining, for each 2D image in the set of 2D images, a respective camera angle and a respective camera position for the 2D image, training a neural radiance field (NeRF) model, using the set of 2D images and the set of camera angles and camera positions as a training dataset, to obtain a trained NeRF model, generating a set of 2D depth maps based on the trained NeRF model, and generating a 3D polygonal mesh representing at least one object of one or more objects in the scene based on the set of 2D depth maps.

20 Claims, 9 Drawing Sheets

$(x, y, z, \theta, \phi)$

310

320

(56)  References Cited

OTHER PUBLICATIONS

Schonberger et al. "Structure-From-Motion Revisited," Proceedings of the IEEE Conference on Computer Vision and Pattern Recognition (CVPR) 2016, pp. 4104-4113 (available at: https://openaccess.thecvf.com/content_cvpr_2016/html/Schonberger_Structure-From-Motion_Revisited_CVPR_2016_paper.html) (Jun. 2016).

Wang et al. "NeuS: Learning Neural Implicit Surfaces by Volume Rendering for Multi-view Reconstruction," 35th Conference on Neural Information Processing Systems (NeurIPS 2021), Version 3 (available at: https://arxiv.org/abs/2106.10689) (Feb. 1, 2023).

Martin-Brualla et al. "NeRF in the Wild: Neural Radiance Fields for Unconstrained Photo Collections," Proceedings of the IEEE/CVF Conference on Computer Vision and Pattern Recognition (CVPR) 2021, pp. 7210-7219 (available at: https://openaccess.thecvf.com/content/CVPR2021/html/Martin-Brualla_NeRF_in_the_Wild_Neural_Radiance_Fields_for_Unconstrained_Photo_CVPR_2021_paper.html) (Jun. 2021).

Zhang et al. "NeRFactor: Neural Factorization of Shape and Reflectance Under an Unknown Illumination," ACM Trans. Graph., vol. 40, No. 6, Article 237 (available at: https://arxiv.org/abs/2106.01970) (Dec. 2021).

Tewari et al. "State of the Art on Neural Rendering," Eurographics 2020, vol. 39, No. 2, pp. 701-727 (available at: https://arxiv.org/abs/2004.03805) (May 2020).

Garofalo, Emma. "An Introduction to Hard Surface 3D Modeling," Make Use of, Valnet Inc. (available at: https://www.makeuseof.com/what-is-hard-surface-modeling/) (Feb. 15, 2022).

Betts, Henry. "An Attempt at Bullet Time" (available at: https://web.archive.org/web/20230103023113/http://henrybetts.co.uk/an-attempt-at-bullet-time/) (Jan. 3, 2023).

Schoenberger, Johannes L. "COLMAP: Tutorial" (available at: https://web.archive.org/web/20230226114630/https://colmap.github.io/tutorial.html) (Feb. 26, 2023).

Peng et al. "Neural Body: Implicit Neural Representations with Structured Latent Codes for Novel View Synthesis of Dynamic Humans," Proceedings of the IEEE/CVF Conference on Computer Vision and Pattern Recognition (CVPR) 2021, pp. 9054-9063 (available at: https://openaccess.thecvf.com/content/CVPR2021/html/Peng_Neural_Body_Implicit_Neural_Representations_With_Structured_Latent_Codes_for_CVPR_2021_paper.html) (Jun. 2021).

Tancik et al. "Block-NeRF: Scalable Large Scene Neural View Synthesis," Proceedings of the IEEE/CVF Conference on Computer Vision and Pattern Recognition (CVPR) 2022, pp. 8248-8258 (available at: https://arxiv.org/abs/2004.03805) (Jun. 2022).

Xiangli et al. "CityNeRF: Building NeRF at City Scale," arXiv 2021, Ver. 2 (available at: https://arxiv.org/abs/2112.05504v2) (Dec. 17, 2021).

Zhang et al. "Dive into Deep Learning" (available at: https://d2l.ai/d2l-en.pdf) (Feb. 10, 2023).

* cited by examiner

110

120

130

$(x, y, z, \theta, \phi) \longrightarrow \boxed{|||} \longrightarrow (r, g, b, \sigma)$ $F_\Theta$

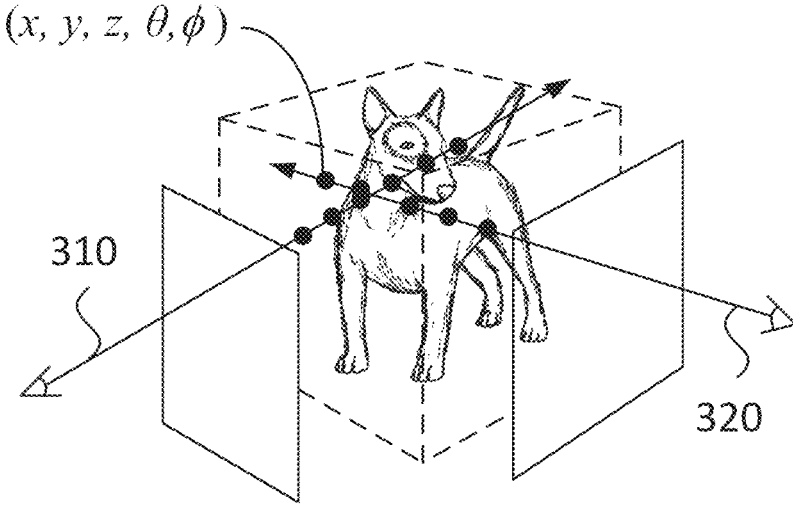
$(x, y, z, \theta, \phi)$
310
320
*FIG. 3A*
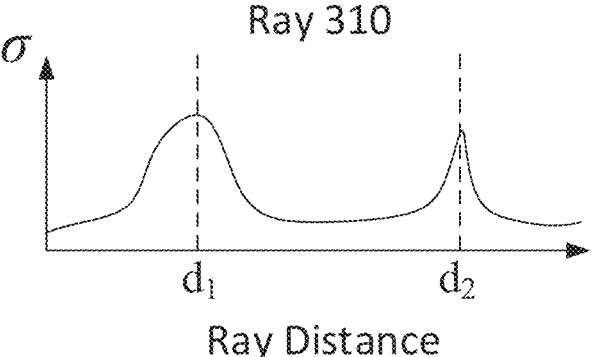
Ray 310
$\sigma$
$d_1$          $d_2$
Ray Distance
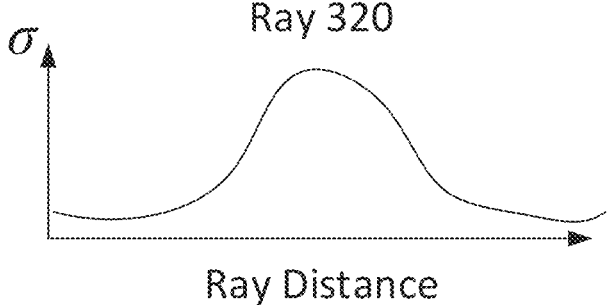
Ray 320
$\sigma$
Ray Distance
*FIG. 3B*

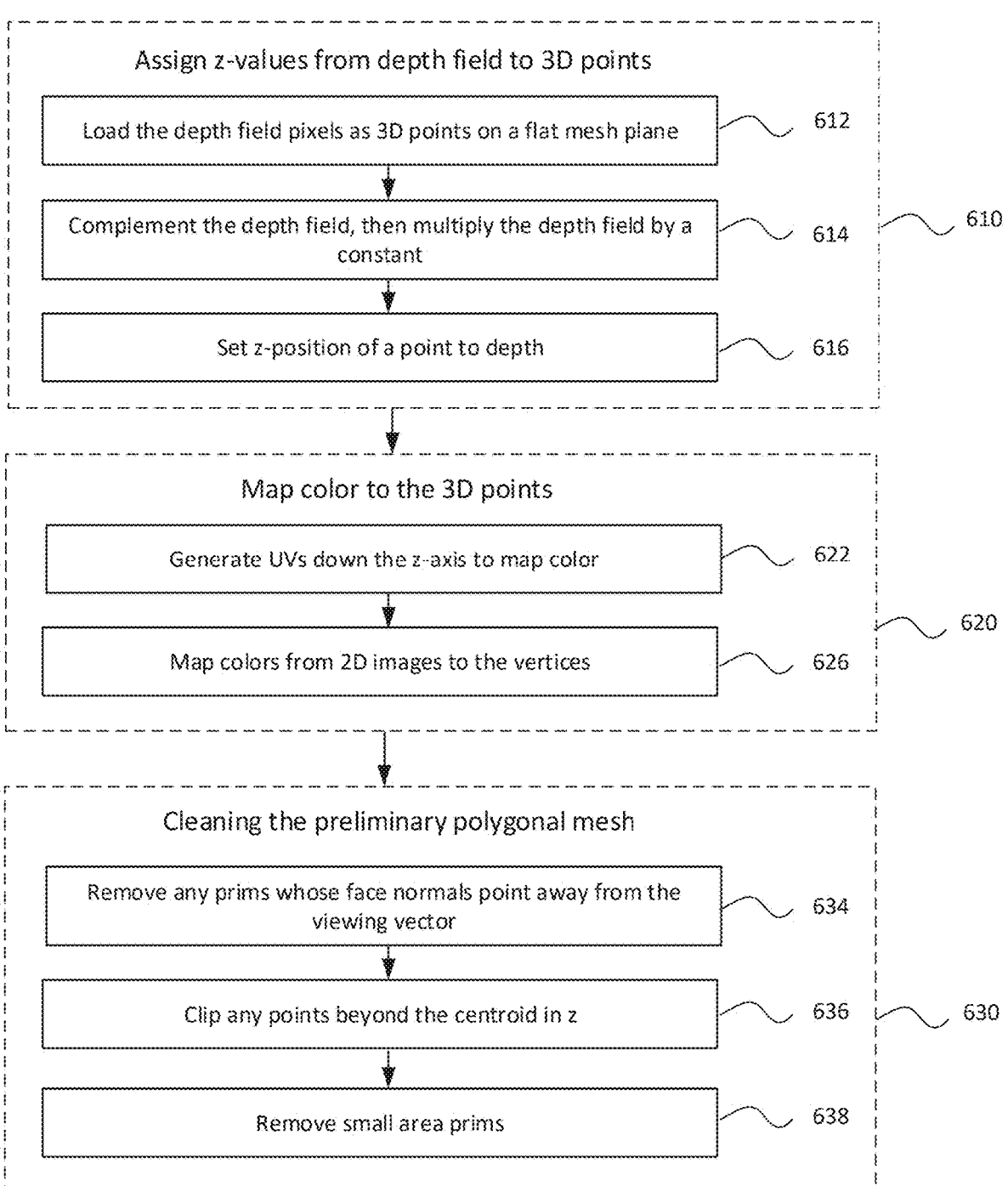

Assign z-values from depth field to 3D points

Load the depth field pixels as 3D points on a flat mesh plane — 612

Complement the depth field, then multiply the depth field by a constant — 614

Set z-position of a point to depth — 616

610

Map color to the 3D points

Generate UVs down the z-axis to map color — 622

Map colors from 2D images to the vertices — 626

620

Cleaning the preliminary polygonal mesh

Remove any prims whose face normals point away from the viewing vector — 634

Clip any points beyond the centroid in z — 636

Remove small area prims — 638

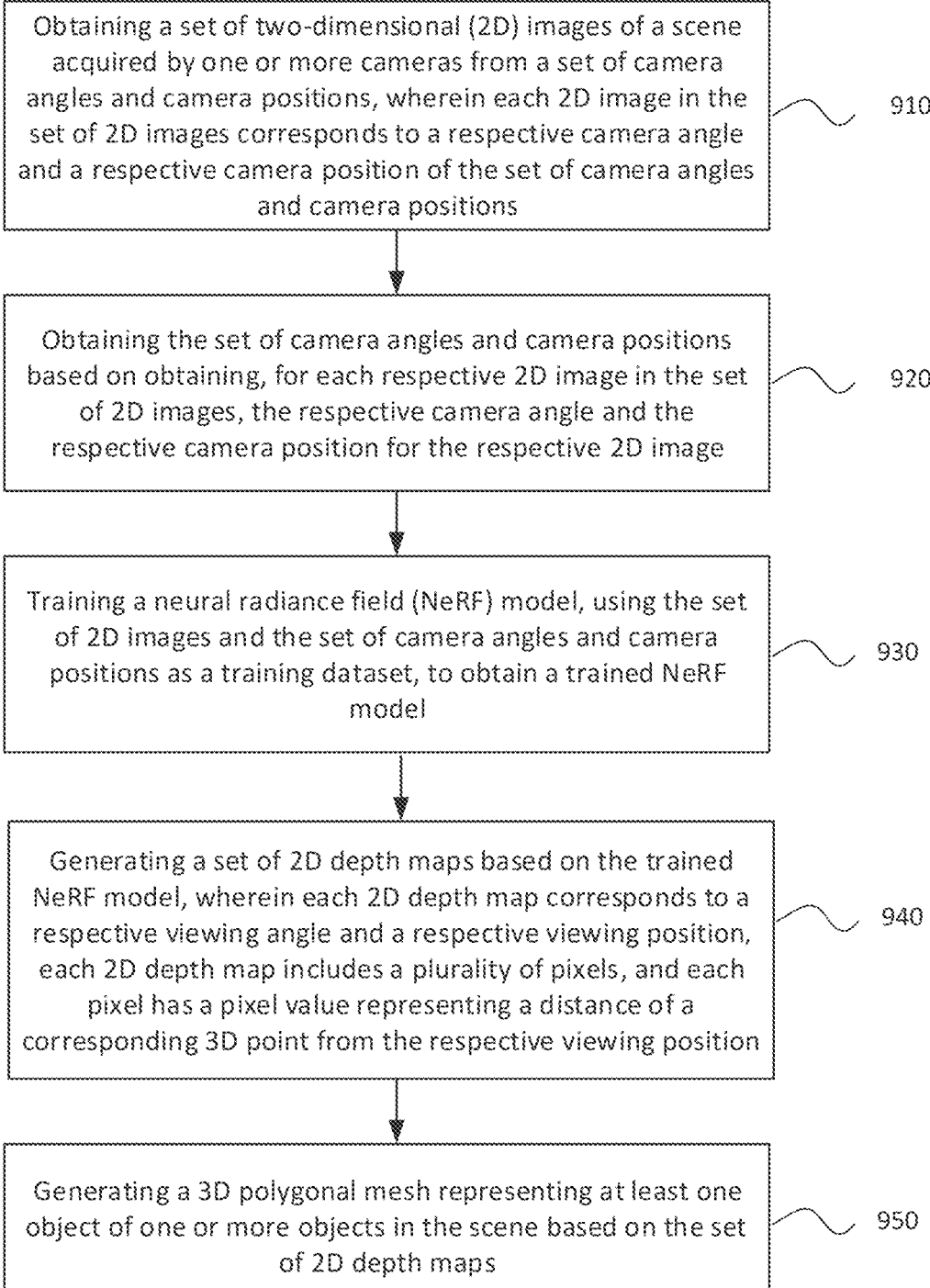

Obtaining a set of two-dimensional (2D) images of a scene acquired by one or more cameras from a set of camera angles and camera positions, wherein each 2D image in the set of 2D images corresponds to a respective camera angle and a respective camera position of the set of camera angles and camera positions — 910

Obtaining the set of camera angles and camera positions based on obtaining, for each respective 2D image in the set of 2D images, the respective camera angle and the respective camera position for the respective 2D image — 920

Training a neural radiance field (NeRF) model, using the set of 2D images and the set of camera angles and camera positions as a training dataset, to obtain a trained NeRF model — 930

Generating a set of 2D depth maps based on the trained NeRF model, wherein each 2D depth map corresponds to a respective viewing angle and a respective viewing position, each 2D depth map includes a plurality of pixels, and each pixel has a pixel value representing a distance of a corresponding 3D point from the respective viewing position — 940

Generating a 3D polygonal mesh representing at least one object of one or more objects in the scene based on the set of 2D depth maps — 950

*FIG. 9*

DEPTH RENDERING FROM NEURAL RADIANCE FIELDS FOR 3D MODELING

TECHNICAL FIELD

This disclosure generally relates to computer graphics and, more particularly, to systems and methods related to generating three-dimensional (3D) models from two-dimensional (2D) images.

BACKGROUND

There is an important demand for 3D content for computer graphics. 3D modeling is the process of creating a digital model of an object or a surface within a 3D space. 3D models can serve a multitude of purposes. For example, in the entertainment industry, 3D models can bring life to characters and environments in films and video games. Industrial designers can use 3D models to visualize and prototype products. In the medical field, 3D models can be used for detailed visualization of anatomies, aiding research and education.

3D models can be represented by explicit functions. For example, 3D models can be represented by voxels, point clouds, or polygonal meshes. A voxel refers to a grid point in a 3D grid (e.g., with an x, y and z coordinate). A voxel is analogous to a pixel in a 2D image. Each voxel contains a color value. A point cloud is a discrete set of data points in 3D space representing a surface of an object. A polygonal mesh is a collection of vertices, edges, and faces that defines the shape of a polyhedral object. The faces usually include triangles (i.e., a triangle mesh), quadrilaterals (quads), or other simple convex polygons (n-gons). Each of these forms of explicit representation of 3D models can have some limitations or disadvantages. For example, voxel representation of 3D models can occupy a very large memory. Point cloud representation of 3D models lack connectivity information. Polygonal meshes may not allow arbitrary topologies.

3D models can be created manually, algorithmically (procedural modeling), or by scanning. Manual methods are usually time-consuming and require a lot of effort from artists. One way of obtaining 3D models is by 3D reconstruction. 3D reconstruction involves converting a set of 2D images or videos into a 3D representation. It is the reverse process of obtaining 2D images from 3D scenes. A 2D image is a projection from a 3D scene onto a 2D plane. In this process, the depth information is lost. A 3D point corresponding to a specific image point is constrained to be on the line of sight. From a single image, it is not possible to determine which point on this line corresponds to the image point. If two images are available, then the position of a 3D point can be found as the intersection of the two projection rays. This process is referred to as triangulation. 3D reconstruction often involves techniques like photogrammetry, in which multiple photographs are taken of an object or a scene from different viewpoints in order to create a 3D model of the object or the scene. Some existing systems for constructing 3D models involve complicated hardware (e.g., stereo rigs) and software, resulting in a high cost.

Therefore, there is a need for improved photogrammetry pipeline that can generate high quality meshes automatically.

SUMMARY

Embodiments of the disclosure provide a method, computer-readable storage medium, and device for generating 3D models from 2D images. The method includes obtaining a set of two-dimensional (2D) images of a scene acquired by one or more cameras from a set of camera angles and camera positions. Each 2D image in the set of 2D images corresponds to a respective camera angle and a respective camera position of the set of camera angles and camera positions. The method further includes obtaining the set of camera angles and camera positions based on obtaining, for each 2D image in the set of 2D images, the respective camera angle and the respective camera position for the 2D image. The method further includes training a neural radiance field (NeRF) model, using the set of 2D images and the set of camera angles and camera positions as a training dataset, to obtain a trained NeRF model, and generating a set of 2D depth maps based on the trained NeRF model. Each 2D depth map corresponds to a respective viewing angle and a respective viewing position. Each 2D depth map includes a plurality of pixels, and each pixel has a pixel value representing a distance of a corresponding 3D point from the respective viewing position. The method further includes generating a 3D polygonal mesh representing at least one object of one or more objects in the scene based on the set of 2D depth maps.

BRIEF DESCRIPTION OF THE DRAWINGS

FIG. 2 and FIGS. 3A-3B illustrate the concept of a neural radiance fields (NeRF) algorithm according to some embodiments.

FIG. 6 illustrates an example postprocessing pipeline to generate a 3D mesh from a depth field according to some embodiments.

FIG. 9 is a flow diagram of method steps for generating 3D models of one or more objects in a scene according to some embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of this disclosure provide systems and methods for generating three-dimensional (3D) models from two-dimensional (2D) images using neural radiance fields (NeRFs). A set of 2D training images of a scene is acquired and is used to train a NeRF model. The trained NeRF model is an implicit 3D model of the scene. A depth field can be generated based on the trained NeRF model. The depth field is postprocessed to generate a 3D mesh representing one or more objects in the scene. High quality 3D meshes can be obtained automatically for both casual world scenes and lightstage scenes.

3D reconstruction using artificial intelligence (AI) or machine learning (ML) is a fast developing field. In particular, neural radiance fields (NeRF) has emerged as a promising tool for 3D reconstruction. The NeRF algorithm can synthesize multiple views of a scene by optimizing an underlying continuous volumetric scene function using a sparse set of input 2D images. It represents a scene implicitly as a radiance field parametrized by a fully connected (non-convolutional) deep neural network (DNN). The network predicts a volume density and view-dependent emitted radiance given the spatial location (x, y, z) and viewing direction in Euler angles ($\theta$, $\phi$) of a camera. By sampling many points along camera rays, a 2D image can be rendered using traditional volume rendering techniques.

Figure 1:
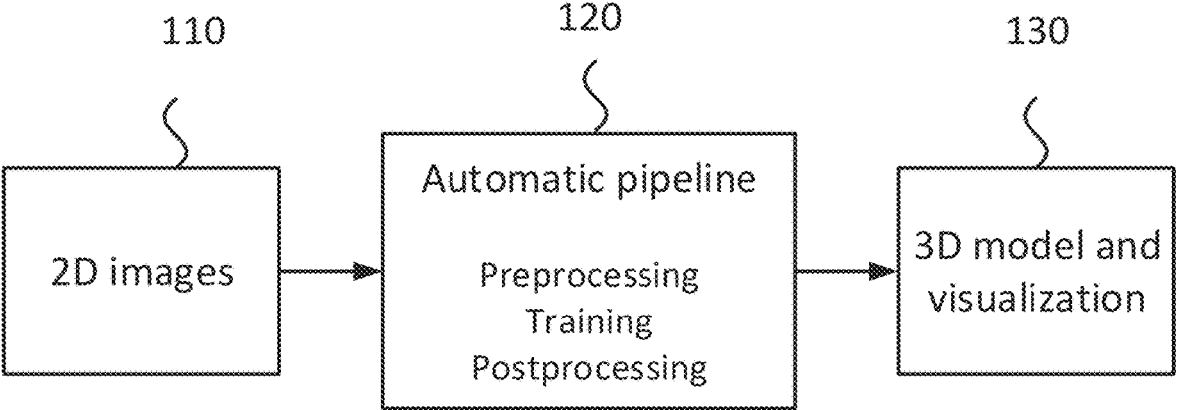
FIG. 1 illustrates an example method of generating a 3D model of an object according to some embodiments.

FIG. 1 illustrates an example method of generating a 3D model of an object according to some embodiments. At 110, a set of 2D images of a scene is provided. The scene may include one or more objects. The set of 2D images are acquired by one or more cameras from various viewpoints. In some embodiments, the set of 2D images can also include frames of a video. At 120, the set of 2D images is input into an automatic pipeline. The automatic pipeline can include the steps of, for example, preprocessing, training a NeRF model, and postprocessing. The set of 2D images is used as a training dataset for training the NeRF model. At 130, the automatic pipeline outputs a 3D model (e.g., a mesh) representing one or more objects in the scene. The 2D images can be obtained from lightstage scan data, or from casual world captures (e.g., outdoor scenes captured by a mobile phone camera).

Figure 2:
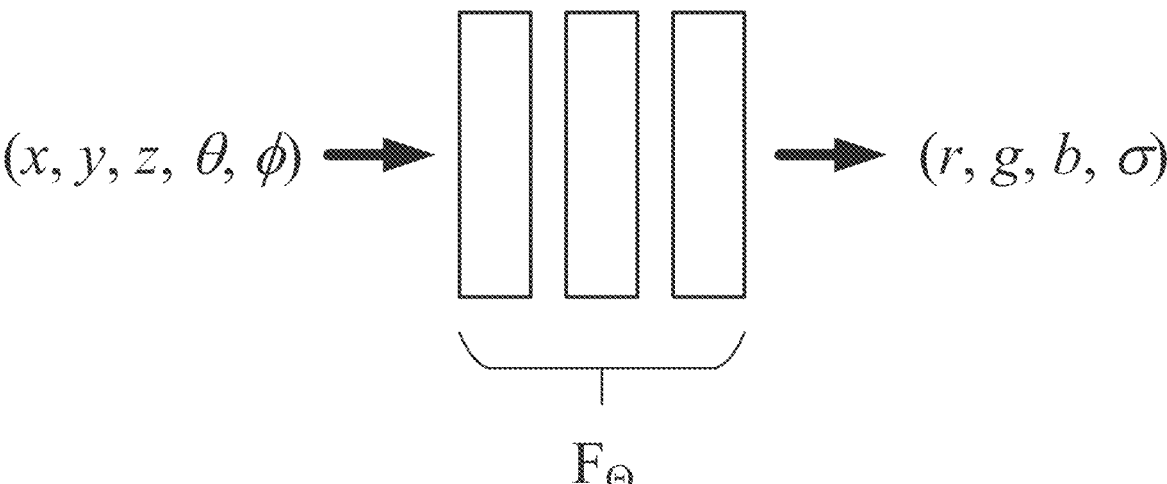

FIG. 2 and FIGS. 3A-3B illustrate the concept of a NeRF algorithm, according to some embodiments. A continuous scene is represented as a five-dimensional (5D) vector-value function $F_\Theta$. As illustrated in FIG. 2 and FIG. 3A, the input to the function $F_\Theta$ is a 3D location n=(x, y, z) and a 2D viewing direction d=($\theta$, $\phi$), where $\phi$ is the azimuthal angle (e.g., from zero to 360 degrees), and $\theta$ is the polar angle (e.g., from zero to 90 degrees). As illustrated in FIG. 2, the output of the function $F_\Theta$ is an emitted color c=(r, g, b) (e.g., for the three primary colors: red, green, and blue), and a volume density $\sigma$. The volume density indicates the opacity, controlling how much radiance is accumulated by a ray passing through the point (x, y, z). For example, if there is an opaque surface at that point, the density would have a high value (e.g., showing a peak in the plot of the density versus ray distance in FIG. 3B); if there is no object at that point, the density would have a low or zero value; and if there is a semi-transparent surface at that point, the density would have a medium value.

The function $F_\Theta$ is approximated by a fully-connected neural network without any convolutional layers (referred to as a multilayer perceptron or MLP, also referred to herein as a NeRF model). The weights $\Theta$ of the NeRF model are optimized using a set of 2D training images as ground truths. For example, as illustrated in FIG. 3A, for a first ray 310 from a first viewing direction, a number of points (represented by the solid dots) can be sampled along the first ray 310 (e.g., 128 points or 256 points). Similarly, for a second ray 320 from a second viewing direction, a number of points can be sampled along the second ray 320. The 3D location coordinate n=(x, y, z) and the 2D viewing direction coordinate d=($\theta$, $\phi$) would be input to the function $F_\Theta$. The output of the function $F_\Theta$ would be the color c=(r, g, b) and the density $\sigma$ for each of the sampled points.

In FIG. 3B, the densities for each ray are plotted as a function of ray distance. In some embodiments, the curve of densities for each ray can be colored to represent the color as a function of ray distance (from camera or view location). Using classical volume rendering techniques, the colors and the densities along each ray are accumulated to produce an estimated color value for that viewing angle in a 2D image. The estimated color value is compared to that of a ground truth (e.g., from one of the training images). The weights $\Theta$ of the NeRF model can be optimized by minimizing an error function (e.g., a mean square error function or an $L_2$ error function). The error function is also referred herein as a loss function. Once trained or optimized, the weights $\Theta$ of the function $F_\Theta$ implicitly represent a 3D model of the scene, and can be used to render 2D images of the scene from any arbitrary viewing angles.

Figure 4:
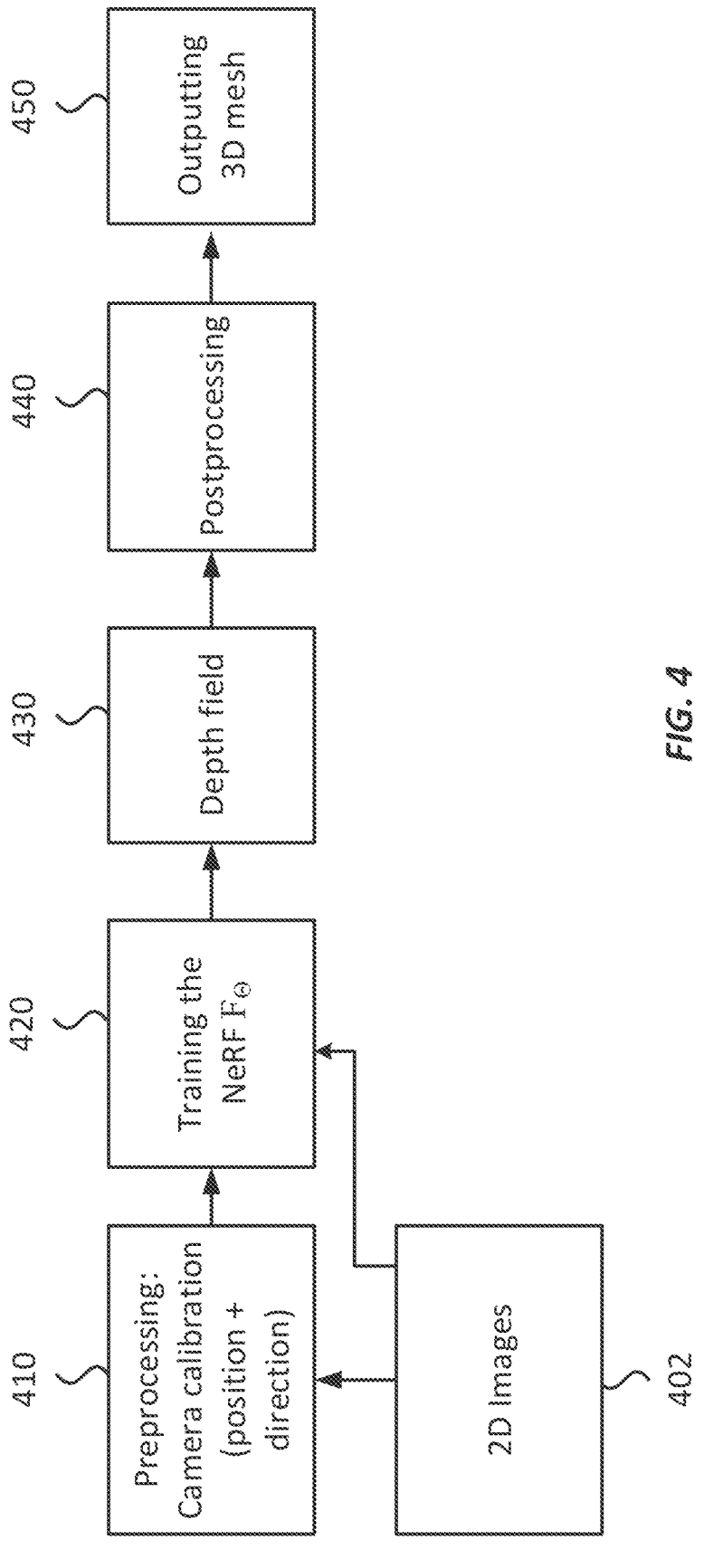
FIG. 4 illustrates an example pipeline of creating a 3D mesh representing one or more objects using NeRF according to some embodiments.

FIG. 4 illustrates an example pipeline of creating a 3D mesh representing one or more objects using NeRF according to some embodiments. At 402, a set of training images 402 is obtained. The set of training images 402 includes overlapping sparse 2D images of the one or more objects, taken from different viewpoints (e.g., by one or more cameras, including video cameras). At 410, the set of training images 402 is preprocessed. The output of the preprocessing are intrinsic and extrinsic camera parameters (for example, positions and directions of the cameras) for the training images 402. The output of the preprocessing is referred herein as camera calibration data. The preprocessing can be performed, for example, using the COLMAP algorithm. In some embodiments, the set of training images 402 is acquired in a lightstage setting, in which the positions and directions of the cameras are already known. In such cases, preprocessing can be omitted.

Still referring to FIG. 4, at 420, the set of training images 402 and the camera calibration data are used to train the NeRF model. Rays from those camera positions and directions are queried during the training, as described above with respect to FIGS. 3A and 3B. At 430, the trained NeRF model is used to extract a depth representation of the objects in the scene. The depth representation is referred herein as a depth field. The depth field can be extracted automatically from the trained NeRF model by launching a set of rays from a set of viewing angles and viewing positions, and recording locations in the 3D space where the rays encounter object surfaces. For example, referring to FIGS. 3A and 3B, the density versus ray distance plot for the first ray 310 exhibits two peaks at distances $d_1$ and $d_2$, respectively. It can be inferred that the first ray 310 encounters an object surface at each of those two locations. The set of viewing angles and viewing positions for obtaining the depth field can correspond to the camera angles and camera positions of the set of 2D training images 402, or can be a different. At 440, postprocessing is performed on the depth field to generate a 3D mesh representing the objects in the scene, as described in more detail below. At 450, the 3D mesh is output.

Figure 5:
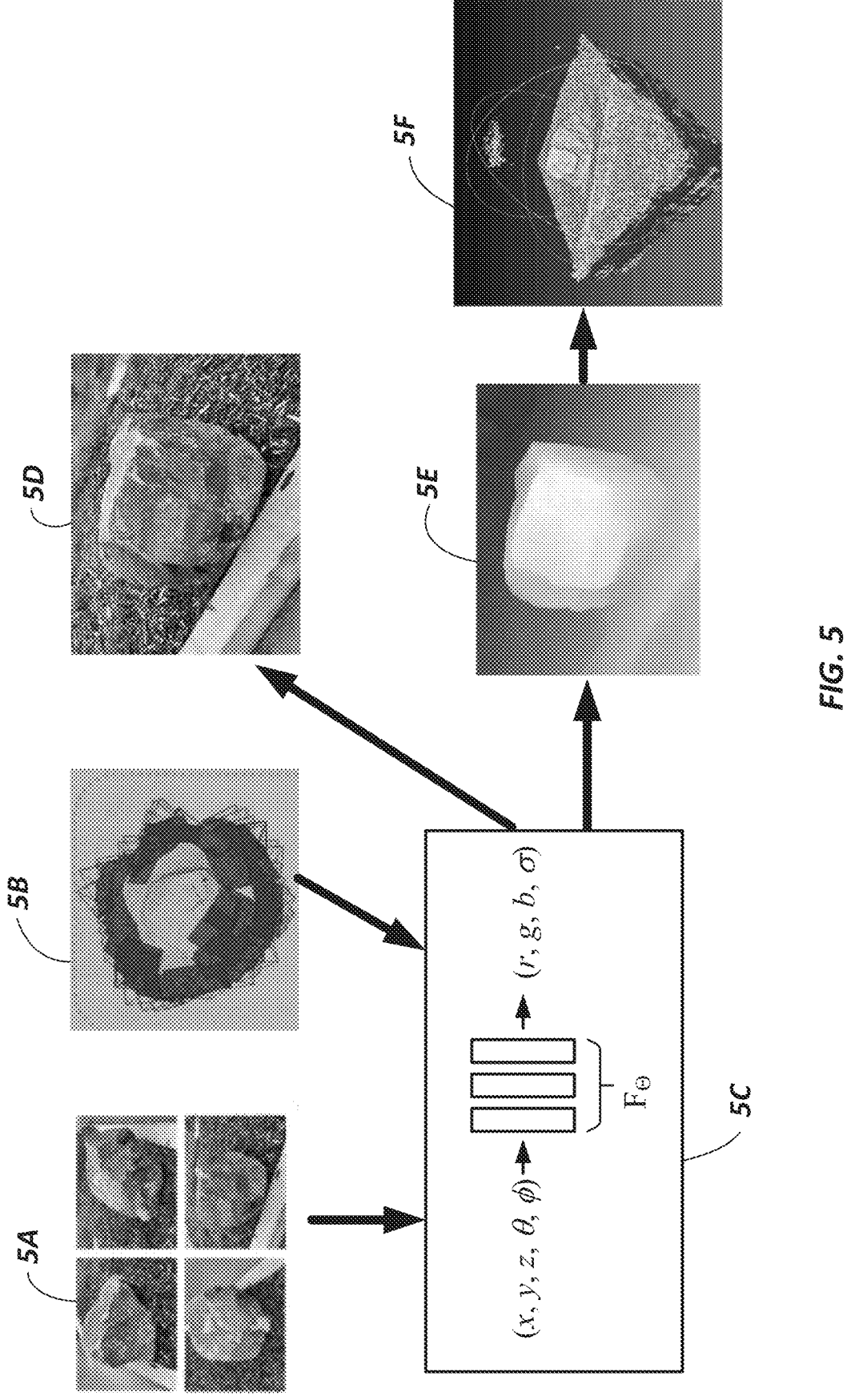
FIG. 5 illustrates an example of creating a 3D mesh of an object from real-world capture data according to some embodiments.

FIG. 5 illustrates an example of creating a 3D mesh of an object from real-world capture data according to some embodiments. As illustrated in block 5A, a set of 2D images of a rock (e.g., a rock on a sidewalk) is captured using a camera (e.g., a mobile phone camera) from various angles. As illustrated in block 5B, camera calibration is performed to obtain camera calibration data, including a set of camera positions and camera directions corresponding to the set of 2D images. As illustrated in block 5C, the set of 2D images and the camera calibration data are used to train a NeRF model $F_\Theta$. Once trained, the NeRF model $F_\Theta$ can be used to infer a depth field, as well as for rendering 2D images of the scene from any arbitrary viewing angles. Block 5D illustrates a 2D image of the rock rendered from a certain viewing angle. Block 5E illustrates a 2D grey-scale image of the depth field (also referred to as a depth map), projected from the same viewing angle as in block 5D. The pixel values of the 2D depth map represent depths or distances from the viewing position. Block 5F illustrates a 3D mesh generated from the depth field after postprocessing. The 3D mesh represents objects in the scene, including the rock.

FIG. 6 illustrates an example postprocessing pipeline to generate a 3D mesh from a depth field according to some embodiments. The postprocessing pipeline can include the following general steps. At 610, z-values from the depth field are assigned to points in a grid mesh in 3D space (referred to as 3D points). The 3D points are then displaced to represent surfaces of the objects in the scene. At 620, colors are mapped to the 3D points. Step 620 may be optional. At 630, the resulting polygonal mesh is cleaned to represent the final model.

Step 610 can include the following substeps. At 612, the depth field is loaded, where each pixel of the image is represented by a 3D point on a flat mesh plane. The depth field includes a set of 2D depth maps queried from a set of viewing angles and viewing positions. Each 2D depth map corresponds to a respective viewing angle and a respective viewing position, and includes a plurality of pixels. Each pixel has a pixel value representing a distance of a corresponding 3D point from the respective viewing position. The pixel values of the 2D depth maps would be in a range from zero (0) to one (1), where the value of zero represents the closest point, and the value of one represents the farthest point. At 614, the complement of the depth field is obtained and the depth field is then multiplied by a constant, which determines the absolute depths. A complement (Depth-Complement) of the depth field can be obtained by computing, for each pixel, DepthComplement=1−Depth. After the multiplication by the constant, the depth range could go from 0-1 to 0-100, for example. At 616, for each respective 2D depth map, a z-value for each respective point is set to the distance according to the respective 2D depth map and displaced in the Z axis. Thereby, a set of 3D points representing object surfaces is obtained.

Step 620 can include the following substeps. At 622, a UV attribute is generated down the Z axis to match the generated NeRF views. UV mapping is the process of projecting a 2D image onto a surface of a 3D model for texture mapping. The letters "U" and "V" denote the axes of the 2D texture. At 626, the colors (or textures) of the UV maps are assigned to the corresponding 3D points.

Step 630 can include the following substeps. At 634, for each viewing angle and viewing position in a set of viewing angles and viewing positions, any primitives (e.g., triangles or polygons) whose surface normal vectors point away from the viewing direction are removed. For example, if a dot product of the surface normal vector of a primitive and the viewing vector is positive, the primitive can be removed. At 636, for each pixel, any points beyond a centroid around the z-value of the pixel are removed. For example, the centroid around the z-value can be defined by a predefined delta distance. Any points corresponding to that pixel, whose distance deviate from the z-value by more than the predefined delta distance, are removed. At 638, small area prims (e.g., areas <0.1) are removed. In some embodiments, the processes described in FIG. 6 can be cached, so that the polygonal mesh can be previewed in real time.

Figure 7A:
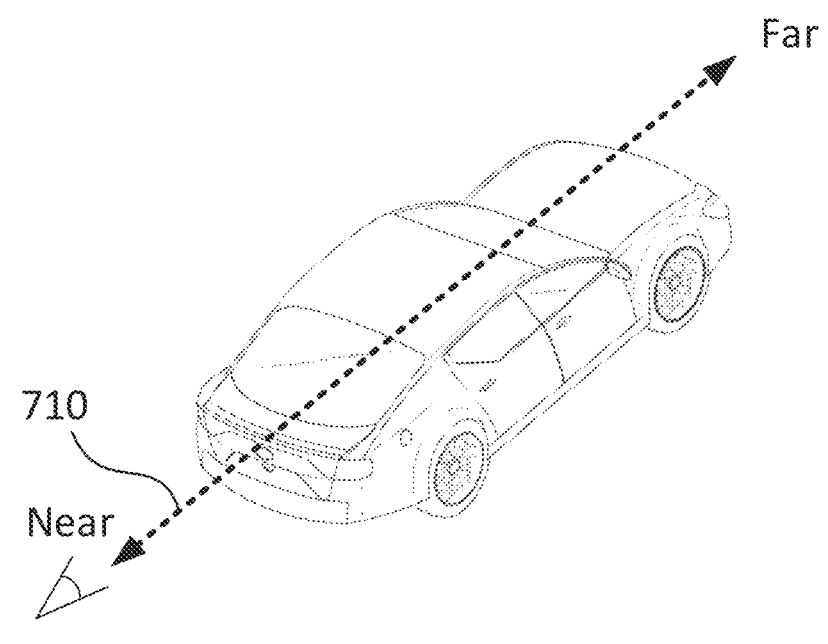
FIGS. 7A and 7B illustrate examples of setting adaptive region thresholds for generating 3D meshes from depth field according to some embodiments.
Figure 7B:
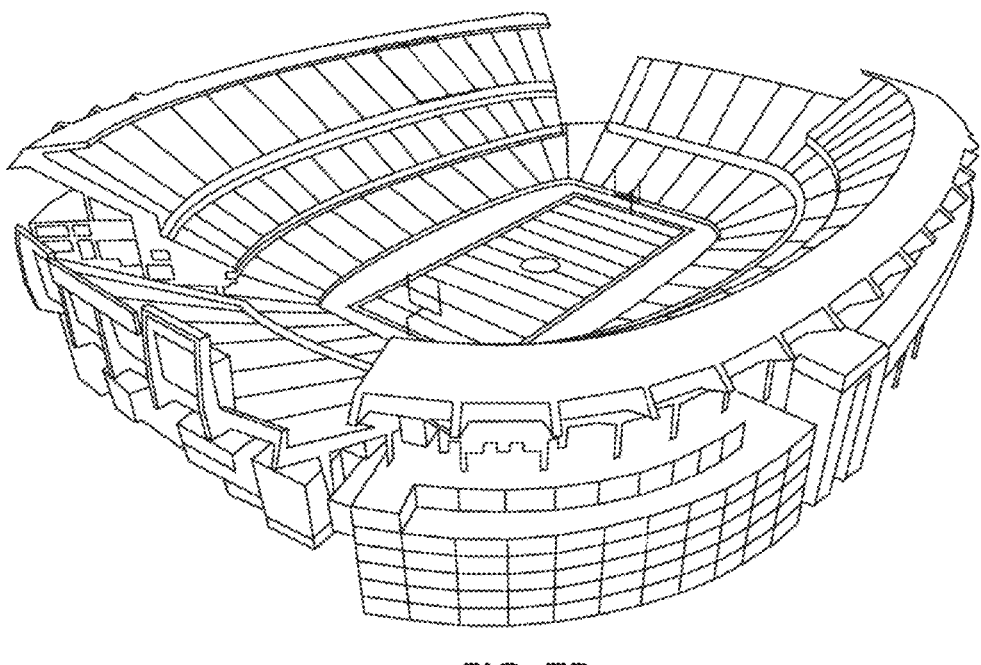

According to some embodiments, before converting the set of 3D points into a polygonal mesh at 630 (or before mapping colors to the set of 3D points at 620), an adaptive region threshold can be set depending on the region of interest. FIGS. 7A and 7B illustrate some examples. In one implementation, for a given viewing direction 710, the normalized distances from the viewing position are in the range of [0-1] (i.e., inclusive of 0 and 1), where the value of zero represents the nearest distance, and the value of one represents the farthest distance. In this example, the scene includes a car. There may be other foreground and/or background objects in the scene, such as bushes or a wall (not shown in FIG. 7A). If the object of interest is the car only, then the region threshold can be set to the intermediate distance range surrounding the car. Those 3D points outside this distance range can be excluded. For example, the region threshold can be set to [0.3-0.8], so that only the car is included in the 3D mesh. By limiting to the specified region threshold, the objects in the region of interest can be modeled more accurately and with higher resolution. In the example illustrated in FIG. 7B, the scene includes a stadium. If the objects of interest include both the football field and the spectator areas, the region threshold can be set to [0-1], so that everything would be included in the 3D mesh.

Figure 8:
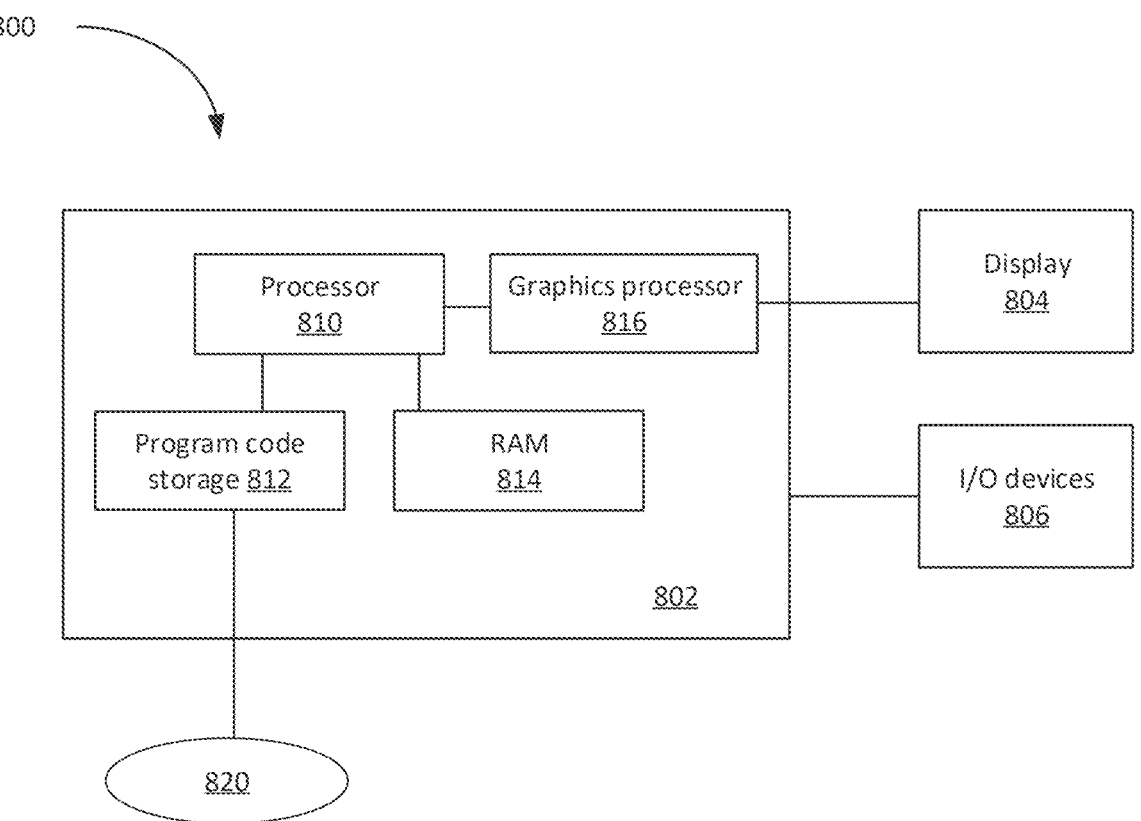
FIG. 8 is a block diagram of a computer system for generating 3D models according to aspects of the present disclosure.

FIG. 8 is a block diagram of a computer system 800 for generating 3D models according to aspects of the present disclosure. The computer system 800 is shown comprising a console 802 coupled to a display 804 and input/output (I/O) devices 806. Console 802 is shown including a processor 810, program code storage 812, temporary data storage 814, and a graphics processor 816. Console 802 may be a general-purpose laptop or desktop computer, or other suitable computing system, such as a mobile phone or tablet computer. Although shown as one processor in FIG. 8, processor 810 may include one or more processors having one or more processing cores. Similarly, although shown as one graphics processor in FIG. 8, graphics processor 816 may include one or more graphics processors having one or more processing cores.

Program code storage 812 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 820 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

In one embodiment, I/O devices 806 are devices a user interacts with console 802. I/O devices 806 may include any device for interacting with console 802, including but not limited to joystick, keyboard, mouse, keypad, virtual reality (VR) or augmented reality (AR) headset or device, etc.

Display 804 can be any type of display device, including a television, computer monitor, laptop screen, mobile device screen, tablet screen, etc. In some embodiments, I/O devices 806 and display 804 comprise a common device, e.g., a touchscreen device. Still further, in some embodiments, one or more of the I/O devices 806 and display 804 are integrated in the console 802.

Various other components may be included in console 802, but are omitted for clarity. An example includes a networking device configured to connect the console 802 to a network, such as the Internet.

FIG. 9 is a flow diagram of method steps for generating a 3D model of one or more objects in a scene according to some embodiments. In various implementations, the method can be performed by the processor 810, the graphics processor 816, or a combination of the processor 810 and the graphics processor 816.

The method includes, at 910, obtaining a set of two-dimensional (2D) images of a scene acquired by one or more cameras from a set of camera angles and camera positions. Each 2D image in the set of 2D images corresponds to a respective camera angle and a respective camera position of the set of camera angles and camera positions. In some embodiments, the one or more cameras can include a mobile phone camera or a video camera. In some embodiments, the scene can be a casual world scene or a lightstage scene.

The method further includes, at 920, obtaining the set of camera angles and camera positions based on obtaining, for each respective 2D image in the set of 2D images, the respective camera angle and the respective camera position for the respective 2D image. In some embodiments, the obtaining the set of camera angles and camera positions includes preprocessing each respective 2D image in the set of 2D images using a COLMAP algorithm to obtain the respective camera angle and the respective camera position for the respective 2D image.

The method further includes, at 930, training a neural radiance field (NeRF) model, using the set of 2D images and the set of camera angles and camera positions as a training dataset, to obtain a trained NeRF model.

The method further includes, at 940, generating a set of 2D depth maps based on the trained NeRF model. Each 2D depth map corresponds to a respective viewing angle and a respective viewing position. Each 2D depth map includes a plurality of pixels. Each pixel has a pixel value representing a distance of a corresponding 3D point from the respective viewing position. In some embodiments, the method further includes, for each respective 2D depth map of the set of 2D depth maps, excluding 3D points that lie outside a predetermined distance range from the corresponding viewing position.

The method further includes, at 950, generating a 3D polygonal mesh representing at least one object of one or more objects in the scene based on the set of 2D depth maps. In some embodiments, the generating the 3D polygonal mesh includes, for each respective 2D depth map of the set of 2D depth maps, setting a z-value for each respective pixel to the distance according to the respective 2D depth map to obtain a set of 3D points, the set of 3D points forming a preliminary 3D polygonal mesh representing surfaces of the one or more objects in the scene, and refining the preliminary 3D polygonal mesh to obtain the 3D polygonal mesh. In some embodiments, the refining the preliminary 3D polygonal mesh includes, for each respective viewing direction corresponding to a respective 2D depth map, removing any polygonal faces with surface normal vectors pointing away from the respective viewing direction. In some embodiments, the refining the preliminary 3D polygonal mesh further includes, for each respective viewing direction corresponding to the respective 2D depth map, removing any vertices outside a centroid around a 3D point corresponding to the z-value of each respective pixel.

As described above, embodiments of this disclosure provide systems and methods for generating 3D models from 2D images using NeRF. A depth field is generated based on a trained NeRF model. The depth field is postprocessed to generate a 3D mesh representing one or more objects in the scene. High quality 3D meshes can be obtained automatically for both casual world scenes and lightstage scenes according to embodiments of the present disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method of generating a three-dimensional (3D) model, the method comprising:

obtaining a set of two-dimensional (2D) images of a scene acquired by one or more cameras from a set of camera angles and camera positions, wherein each 2D image in the set of 2D images corresponds to a respective camera angle and a respective camera position of the set of camera angles and camera positions;

obtaining the set of camera angles and camera positions based on obtaining, for each 2D image in the set of 2D images, the respective camera angle and the respective camera position for the 2D image;

training a neural radiance field (NeRF) model, using the set of 2D images and the set of camera angles and camera positions as a training dataset, to obtain a trained NeRF model;

generating a set of 2D depth maps based on the trained NeRF model by launching a set of rays to the trained NeRF model from a set of viewing angles and viewing positions and recording locations where the set of rays encounter object surfaces, wherein each 2D depth map corresponds to a respective viewing angle and a respective viewing position of the set of viewing angles and viewing positions, each 2D depth map includes a plurality of pixels, and each pixel has a pixel value representing a distance of a corresponding 3D point from the respective viewing position; and generating a 3D polygonal mesh representing at least one object of one or more objects in the scene based on the set of 2D depth maps.

2. The method of claim 1, wherein the generating the 3D polygonal mesh comprises:

for each respective 2D depth map of the set of 2D depth maps, setting a z-value for each respective pixel to the distance according to the respective 2D depth map to obtain a set of 3D points, the set of 3D points forming a preliminary 3D polygonal mesh representing surfaces of the one or more objects in the scene; and refining the preliminary 3D polygonal mesh to obtain the 3D polygonal mesh.

3. The method of claim 2, wherein the refining the preliminary 3D polygonal mesh comprises:

for each respective viewing direction corresponding to a respective 2D depth map, removing any polygonal faces with surface normal vectors pointing away from the respective viewing direction.

4. The method of claim 3, wherein the refining the preliminary 3D polygonal mesh further comprises:

for each respective viewing direction corresponding to the respective 2D depth map, removing any vertices outside a centroid around a 3D point corresponding to the z-value of each respective pixel.

5. The method of claim 2, further comprising:

before the generating the 3D polygonal mesh, excluding, for each 2D depth map of the set of 2D depth maps, 3D points that lie outside a predetermined distance range from the corresponding viewing position.

6. The method of claim 1, wherein the obtaining the set of camera angles and camera positions comprises:

preprocessing each respective 2D image in the set of 2D images using a COLMAP algorithm to obtain the respective camera angle and the respective camera position for the respective 2D image.

7. The method of claim 1, wherein the one or more cameras comprise a mobile phone camera or a video camera.

8. The method of claim 1, wherein the scene comprises a casual world scene or a lightstage scene.

9. A non-transitory computer-readable storage medium storing instructions that, when executed by one or more processors, cause a computing device to generate a three-dimensional (3D) model, by performing the steps of:

obtaining a set of two-dimensional (2D) images of a scene acquired by one or more cameras from a set of camera angles and camera positions, wherein each 2D image in the set of 2D images corresponds to a respective camera angle and a respective camera position of the set of camera angles and camera positions;

obtaining the set of camera angles and camera positions based on obtaining, for each 2D image in the set of 2D images, the respective camera angle and the respective camera position for the 2D image;

training a neural radiance field (NeRF) model, using the set of 2D images and the set of camera angles and camera positions as a training dataset, to obtain a trained NeRF model;

generating a set of 2D depth maps based on the trained NeRF model by launching a set of rays to the trained NeRF model from a set of viewing angles and viewing positions and recording locations where the set of rays encounter object surfaces, wherein each 2D depth map corresponds to a respective viewing angle and a respective viewing position of the set of viewing angles and viewing positions, each 2D depth map includes a plurality of pixels, and each pixel has a pixel value representing a distance of a corresponding 3D point from the respective viewing position; and generating a 3D polygonal mesh representing at least one object of one or more objects in the scene based on the set of 2D depth maps.

10. The non-transitory computer-readable storage medium of claim 9, wherein the generating the 3D polygonal mesh comprises:

for each respective 2D depth map of the set of 2D depth maps, setting a z-value for each respective pixel to the distance according to the respective 2D depth map to obtain a set of 3D points, the set of 3D points forming a preliminary 3D polygonal mesh representing surfaces of the one or more objects in the scene; and refining the preliminary 3D polygonal mesh to obtain the 3D polygonal mesh.

11. The non-transitory computer-readable storage medium of claim 10, wherein the refining the preliminary 3D polygonal mesh comprises:

for each respective viewing direction corresponding to a respective 2D depth map, removing any polygonal faces with surface normal vectors pointing away from the respective viewing direction.

12. The non-transitory computer-readable storage medium of claim 11, wherein the refining the preliminary 3D polygonal mesh further comprises:

for each respective viewing direction corresponding to the respective 2D depth map, removing any vertices outside a centroid around a 3D point corresponding to the z-value of each respective pixel.

13. The non-transitory computer-readable storage medium of claim 10, wherein the instructions, when executed by the one or more processors, further cause the computing device to perform the step of:

before the generating the 3D polygonal mesh, excluding, for each respective 2D depth map of the set of 2D depth maps, 3D points that lie outside a predetermined distance range from the corresponding viewing position.

14. The non-transitory computer-readable storage medium of claim 9, wherein the obtaining the set of camera angles and camera positions comprises:

preprocessing each respective 2D image in the set of 2D images using a COLMAP algorithm to obtain the respective camera angle and the respective camera position for the respective 2D image.

15. A device for generating a three-dimensional (3D) model, the device comprising:

a memory storing instructions; and one or more processors configured to execute the instructions to cause the device to:

obtain a set of two-dimensional (2D) images of a scene acquired by one or more cameras from a set of camera angles and camera positions, wherein each 2D image in the set of 2D images corresponds to a respective camera angle and a respective camera position of the set of camera angles and camera positions;

obtain the set of camera angles and camera positions based on obtaining, for each 2D image in the set of 2D images, the respective camera angle and the respective camera position for the 2D image;

train a neural radiance field (NeRF) model, using the set of 2D images and the set of camera angles and camera positions as a training dataset, to obtain a trained NeRF model;

generate a set of 2D depth maps based on the trained NeRF model by launching a set of rays to the trained NeRF model from a set of viewing angles and viewing positions and recording locations where the set of rays encounter object surfaces, wherein each 2D depth map corresponds to a respective viewing angle and a respective viewing position of the set of viewing angles and viewing positions, each 2D depth map includes a plurality of pixels, and each pixel has a pixel value representing a distance of a corresponding 3D point from the respective viewing position; and generate a 3D polygonal mesh representing at least one object of one or more objects in the scene based on the set of 2D depth maps.

16. The device of claim 15, wherein the generating the 3D polygonal mesh comprises:

for each respective 2D depth map of the set of 2D depth maps, setting a z-value for each respective pixel to the distance according to the respective 2D depth map to obtain a set of 3D points, the set of 3D points forming a preliminary 3D polygonal mesh representing surfaces of the one or more objects in the scene; and refining the preliminary 3D polygonal mesh to obtain the 3D polygonal mesh.

17. The device of claim 16, wherein the refining the preliminary 3D polygonal mesh comprises:

for each respective viewing direction corresponding to a respective 2D depth map, removing any polygonal faces with surface normal vectors pointing away from the respective viewing direction.

18. The device of claim 17, wherein the refining the preliminary 3D polygonal mesh further comprises:

for each respective viewing direction corresponding to the respective 2D depth map, removing any vertices outside a centroid around a 3D point corresponding to the z-value of each respective pixel.

19. The device of claim 16, wherein the instructions, when executed by the one or more processors, further cause the device to:

before the generating the 3D polygonal mesh, excluding, for each respective 2D depth map of the set of 2D depth maps, excluding 3D points that lie outside a predetermined distance range from the corresponding viewing position.

20. The device of claim 15, wherein the obtaining the set of camera angles and camera positions comprises:

preprocessing each respective 2D image in the set of 2D images using a Colmap algorithm to obtain the respective camera angle and the respective camera position for the respective 2D image.

* * * * *